United States Patent [19]
Bender et al.

[11] Patent Number: 5,143,739
[45] Date of Patent: * Sep. 1, 1992

[54] PROCESS FOR TREATING POULTRY CARCASSES TO CONTROL SALMONELLAE GROWTH

[75] Inventors: Fredric G. Bender, Houston; Eugene Brotsky, Pittsburgh, both of Pa.

[73] Assignee: Rhone-Poulenc Inc.

[*] Notice: The portion of the term of this patent subsequent to Dec. 3, 2008 has been disclaimed.

[21] Appl. No.: 712,260

[22] Filed: Jun. 7, 1991

Related U.S. Application Data

[63] Continuation-in-part of Ser. No. 530,131, May 29, 1990, Pat. No. 5,069,922, which is a continuation of Ser. No. 308,357, Feb. 9, 1989, abandoned.

[51] Int. Cl.⁵ ............... A23L 3/34; A22C 21/00
[52] U.S. Cl. .................... 426/332; 426/335; 426/532; 426/644; 426/652; 514/143
[58] Field of Search ............ 426/332, 335, 532, 644, 426/652; 514/143

[56] References Cited

U.S. PATENT DOCUMENTS 4,683,139 7/1987 Cheng ............... 426/625
5,069,922 12/1991 Brotsky et al. ....... 426/332

OTHER PUBLICATIONS

Humphrey et al. "The Effect on pH Adjustment on the Microbiology of Chicken Scald-tank Water with Particular Reference to the Death Rate of Salmonella," Journal of Applied Bacteriology 1981, 51, pp. 517-527.

J. S. Teotia et al. Chemical Pasteurization of Poultry Meat, Dissertation Abstracts International B., 1974, 34 (a), 4142.

L. L. Hargreaves et al. The Antimicrobial Effect of Phosphate with Particular Reference to Food Products, The British Food Manufacturing Industries Research Association, Scientific and Technical Surveys, No. 76, Apr. 1972, pp. 1-2 @12.

Eugene Brotsky Automatic Injection of Chicken Parts with Polyphosphate Poultry Science, 55 pp. 653-660 (1976).

G. Pacheco et al. Bacteriolytic Action of Phosphates, Mems Institute Oswaldo Cruz, 52 (2) pp. 405-414.

*Primary Examiner*—Joseph Golian
*Assistant Examiner*—Evan Federman

[57] ABSTRACT

Salmonella and other bacteria can be removed, reduced or retarded on poultry carcasses by treating poultry with a treatment solution containing an alkali metal orthophosphate, e.g., trisodium orthophosphate.

15 Claims, No Drawings

PROCESS FOR TREATING POULTRY CARCASSES TO CONTROL SALMONELLAE GROWTH

This application is a continuation-in-part of Ser. No. 07/530,131 filed May 29, 1990, now U.S. Pat. No. 5,069,922, which is a continuation of Ser. No. 308,357 filed Feb., 1989, now abandoned.

The present invention relates to an improved process for reducing the level of and retarding the growth of bacteria, such as salmonellae, in poultry processing and on raw poultry without causing organoleptic depreciation thereof.

BACKGROUND OF THE INVENTION

Poultry is processed, after slaughtering, by scalding to assist in defeathering, defeathering by machine, washing, eviscerating and chilling prior to packing. These treatments are controlled to avoid causing a change in the appearance characteristics of poultry which would make it unsalable.

Poultry, after eviscerating, shows high levels of salmonella bacteria on the surface of the carcass. A large part of carcass contamination with salmonellae can be removed by water washing. While salmonellae can be easily killed by heat, such as during cooking, colony forming units of bacteria can attach and/or reside in the regular and irregular surfaces of the skin, multiply and, thereafter, contaminate working surfaces, hands and utensils. Food spoilage and illness can result from this carry over of bacteria or cross-contamination from the infected carcass to surfaces not heated sufficiently to cause thermal destruction of the bacteria.

Extensive research has been conducted by the art to uncover an economical system for reducing salmonellae contamination of poultry carcasses without causing organoleptic depreciation. Poultry feathers carry large amounts of salmonellae which can contaminate the carcass during scalding and defeathering. Improper evisceration can also be a source of contamination. The use of acids such as lactic or acetic acid, at levels sufficient to effect bacteriological control, causes organoleptic deterioration of the poultry. At acid levels low enough to avoid organoleptic deterioration of the poultry, bacteriostatic effects are reduced.

A treatment system must be economical, easy to use, compatible with food manufacturing, and not change the organoleptic properties of the poultry. Any change in the appearance of the poultry would make the same unsaleable.

It has been reported that the thermal death rate of salmonellae can be increased during scalding by elevating the pH of the scald water to pH 9.0±0.2. Agents such as sodium hydroxide, potassium hydroxide, sodium carbonate, and trisodium phosphate have been reported as effective pH adjusting agents for use in increasing the thermal death rate of the bacteria. Trisodium phosphate was reported as least effective in increasing the death rate. Sodium hydroxide and potassium hydroxide, while effective bacteriostats, can effect the surface of the carcass adversely. Propionic acid and glutaraldehyde, which were also tried as treating agents, are reported as possibly having unfavorable effects on plucking. See "The Effect of pH Adjustment on the Microbiology of Chicken Scald-tank Water With Particular Reference to the Death Rate of Salmonellae", T. J. Humphrey et al., Journal of Applied Bacteriology 1981, 51, pp. 517–527.

T. J. Humphrey et al. have also reviewed the pH effect of scald water on Salmonella on chicken skin. See "The Influence of Scald Water pH on the Death Rates of *Salmonella typhimurium* and Other Bacteria Attached to Chicken Skin", Journal of Applied Bacteriology 1984, 57 (2), pp. 355–359. Scald water adjusted to pH 9±0.2 as in the 1981 paper can help to reduce external and internal cross-contamination of carcasses by salmonellas.

The results reported in the first article are based on assays of samples of scald water taken from the scald tank. The article does not show the effect of the agents on bacterial colonies on the surface of the poultry or the organoleptic effect on the poultry meat or skin.

The second paper teaches that pH adjustment of scald water to pH of 9±0.2 can be used to improve the hygiene of chicken carcasses during plucking by lowering the bacterial carry over from the scald tank.

These references are limited to the scald tank and use relatively low pH conditions and low concentration pH adjusting agents and do not show any long term effect of the agents on the surface of the poultry since the scald water solution and any agents therein are washed off after defeathering.

Humphrey et al. recognize that plucking and subsequent evisceration cause further contamination. The improvements in scalding hygiene reported in their 1984 paper and in their earlier work [1981] help to reduce the growth rate of pathogens on carcass surfaces during plucking but have no measurable effect on the shelf-life or safety or chilled carcasses because of further contamination during evisceration. The organisms responsible for spoilage of meat of this type are added during cold storage or during later stages of processing. (Humphrey et al. 1984 at page 359). Humphrey et al. do not teach reducing the potential for salmonellosis by reducing the incidence and population of salmonella organisms.

Humphrey et al., 1984, also do not show the organoleptic effect of their treatment on the poultry carcasses, much of which is undesirable.

Attempts have been made to pasteurize poultry meat by treating the meat with a solution containing agents such as lactic acid, acetic acid, sodium carbonate, sodium borate, sodium chloride, potassium hydroxide, chlorine and EDTA. All treatments, except sodium borate, sodium chloride, and sodium carbonate, reduced the visual acceptability of the meat. Chlorine failed to destroy bacteria on the surface of the poultry but would be expected to control salmonellae in water. See *Chemical Pasteurization of Poultry Meat*, J.S. Teotia, Dissertation Abstracts Int'l. B., 1974, 34(a), 4142.

The following references treat various meat products to retain moisture, texture and tenderness in meat. U.S. No. 3,782,975 to Zyss issued Jan. 1, 1974 teaches polyphosphate curing of fresh primal cuts of meat with a curing solution at pH 6–8 free of sodium and containing about 1.0 to 20% by weight of a water soluble phosphate which can include orthophosphate.

U.S. No. 3,775,543 to Zyss issued Nov. 27, 1973 uses 0.2–20% by weight of a phosphate (which can be orthophosphate) treatment solution based on the ingredient mix of processed meat. The phosphate is used as a binding agent. Alkaline pH is found to decrease shelf life. Salmonella is killed by cooking not by phosphate.

U.S. No. 3,493,392 to Swartz issued Feb. 3, 1970 pumps tuna with a phosphate treating solution including orthophosphate to improve yield of desired light flesh, to improve odor (less fishy) and to render the meat more tender and less dry. Pumping injects solution deep into the meat or fish and is not a surface treatment. Swartz uses mono and dialkali orthophosphate in example IV and reports poor weight retention results compared to polyphosphates. U.S. No. 3,620,767 to Swartz issued Nov. 16, 1971 pumps bonito with a salt and phosphate including orthophosphate but no example is given. See also Canadian Patent 847,280 issued July 21, 1970 to Swartz. These references employ polyphosphates for their water binding properties.

U.S. No. 2,770,548 teaches the anticaking properties of trialkali metal orthophosphates.

Trisodium phosphate has also been found to be effective in inhibiting the growth of blue mold in cuts and bruises in fruit by tricating the broken surface with the solution of trisodium phosphate (U.S. Pat. No. 1,744,310).

Kohl, et al. U.S. No. 3,681,091 issued Aug. 1, 1972 teaches treating foods including fish fillet with 10% solution of medium chain length polyphosphates.

Freund, et al., U.S. No. 2,957,770 teach improving the properties of meat with a composition which can include inorganic orthophosphates such as disodium hydrogen orthophosphate. Low concentrations of phosphate are employed.

Cheng, U.S. No. 4,683,139 issued July 28, 1987 teaches a process for prepackaged fresh red meat at retail wherein the shelf life of the meat is increased by treatment with an aqueous solution of an alkali metal salt or certain phosphate compounds, a reducing compound such as ascorbic acid and a sequestering or chelating agent such as citric acid. The phosphate can be an orthophosphate, pyrophosphates, tripolyphosphates and hexametaphosphates and will vary in the way the buffer solution is applied to the meat giving a pH below neutral.

Szczesniak et al., U.S. No. 4,075,357, issued Feb. 21, 1978 teaches salt combined with a secondary salt selected from alkali metal salts of organic acids and trisodium orthophosphate, polyphosphate, metaphosphate and ultraphosphate. Citrates are preferred combined with sodium chloride. These mixtures are used to control water activity in low moisture cooked food which have neutral pH.

U.S. No. 3,705,040 to Bynagte issued Dec. 5, 1972 teaches use of a solution of water, 2-3% acid pyrophosphates and 2-15% sodium phosphates including sodium orthophosphate to soak shrimp for at least two minutes followed by cooking for three minutes, cooling and peeling. The process improves the amount of shrimp meat recovered from the shell by reducing the strength of the under skin of the shrimp. Where sodium orthophosphate is employed in Example IV it is employed at 2%.

The preceding patents which pump or treat meat or fish with phosphates generally use needles to inject or mix into meat formulations a phosphate solution to bind water and improve texture of the product. Neutral pH formula's are employed for these purposes. The patents do not teach the present invention of treating the surface of freshly slaughtered poultry with trialkali metal orthophosphate at pH 11.5 or greater to remove, reduce or retard bacterial contamination or growth on the poultry.

U.S. No. 4,592,892 to Ueno et al. issued June 3, 1986 teaches ethanol used to sterilize foods and machines can be enhanced by use of an aqueous solution of an alkali carbonate which may also contain a trialkali metal phosphate. Trialkali metal orthophosphate as well as sodium carbonare and other phosphates is used to treat a broth to reduce E. coli in Table 1. This patent fails to recognize that trisodium phosphate per se can remove, reduce or retard bacterial contamination on poultry. Orthophosphate is used only in combination with ethanol which is a popular disinfectant for machinery and food in Japan.

Thomson et al. "Phosphate and Heat Treatments to Control Salmonella and Reduce Spoilage and Rancidity on Broiler Carcasses *Poultry Science* pp. 139-143, 1979 treats poultry with 6% kena phosphate which is a polyphosphate blend of 90% sodium tripolyphosphate and 10% sodium hexametaphosphate. The phosphates did not significantly or consistently affect salmonella survival or total bacterial growth.

It is known that the shelf life of chicken carcasses can be increased 1 to 2 days by chilling the poultry in a solution of 6% sodium tripolyphosphate/0.7% tetrasodium pyrophosphate (Kena—available from Stauffer Chemical Company Division Of Rhone-Poulenc, Inc.). See *The Antimicrobial Effect Of Phosphate With Particular Reference To Food Products*, L. L. Hargreaves et al., The British Food Manufacturing Industries Research Association, Scientific and Technical Surveys, No. 76, Apr. 1972, pages 1-20 at page 12. Many patents and articles suggest the use of polyphosphates in preserving meat and fish products.

In addition, it is also stated in the Hargreaves reference at page 7 that G. Pacheco and V. M. Dias in an article entitled *Bacteriolytic Action of Phosphates*, Mems Institute Oswaldo Cruz, 52 (2) pp. 405-414, reported on the bacteriolytic action of solutions of monosodium, disodium, trisodium and dipotassium orthophosphates on dead and living cells of *Salmonella typhosa, Escherichia coli and Staphylococcus aureus*. Trisodium phosphate dodecahydrate is stated to have the greatest lytic action. This reference does not relate to treating poultry.

British Patent 935,413 teaches treating raw poultry in the chill tank with a non-cyclic polyphosphate. It is taught that this method provides increased preservation of the poultry flesh by decreasing exudate and thereby decreasing spread of bacteria.

The extensive research conducted by the art has been unsuccessful in providing a treatment to reduce salmonellae levels of poultry carcasses without causing extensive organoleptic depreciation.

The invention provides a poultry carcass wash process which removes or reduces existing salmonellae contamination as well as retards further contamination or growth without affecting the organoleptic properties of the poultry carcasses.

SUMMARY OF THE PRESENT INVENTION

In accordance with the present invention, there is provided a process for treating poultry carcasses to remove or retard bacterial growth, such as salmonellae growth, without affecting the organoleptic properties of the poultry carcasses.

It has been discovered that during poultry processing from about 4% or more, preferably 8% or more, trialkali metal orthophosphate may be added to processing water at any point in the process to elevate the treating solution to above pH 11.5 and remove, reduce or retard bacterial contamination and/or growth on poultry. We prefer to use the aqueous phosphate water solution at places during poultry processing where the treatment solution can be filtered and recycled with make up water to maintain the orthophosphate concentration at above about 4% and the pH above 11.5.

We prefer to employ the trialkali orthophosphate treatment immediately after the scalding treatment either before or after defeathering or during washing of the poultry prior to evisceration or preferably during the inside/outside wash after evisceration. These treatments are conducted using a hot solution and recycling the solution with filtering to economically utilize the phosphate. We can also treat the poultry prior to but preferably after the chill tank particularly using an inside/outside wash. After the chill tank we treat with a cold orthophosphate solution generally below 10° C. It is also possible to treat the poultry after cutting and prior to packaging with cold orthophosphate solution.

The process comprising treating poultry at a temperature below that which would cause organoleptic depreciation in the poultry which normally is below 65° C. preferably below 45° C. Cooled poultry is treated below about 27° C. The treatment solution comprising trialkali metal orthophosphates, said orthophosphate being present in an amount and said poultry being treated for a time sufficient to remove, reduce, or retard bacteriological contamination of the poultry, said orthophosphate agent being present in amounts insufficient to cause substantial organoleptic depreciation of the poultry. Such treatment solutions, have a pH above 11.5.

It is possible but not necessary to treat the poultry, including eviscerated and defeathered poultry, with a blend of a major amount of trialkali metal orthophosphate and a corresponding minor amount of a basic agent, said blend being present in an amount and said poultry being treated for a time sufficient to remove, reduce or retard bacteriological contamination and/or growth on the poultry. The basic agent is used in the blend in amounts insufficient to cause substantial organoleptic depreciation of the poultry. The treatment solution has a pH above 11.5. The trialkali metal orthophosphate is always present per se or in a major amount of the treatment solution with the proviso that alcohol and ascorbic acid are never part of the treatment solution. Preferably the treatment time is longer than about 5 minutes if a dip solution application is used although much shorter times have been found effective. We prefer to use the trialkali metal orthophosphates per se. In any case, from about 4% or more orthophosphate is used.

Specifically, it has been discovered that poultry can be treated with a solution containing from about 4% to about saturation of orthophosphate in the aqueous solution Preferably about 4% to about 12% and most preferably about 8% or more trisodium or tripotassium orthophosphate dodecahydrate or an equivalent amount of the anhydrous compound, is effective. It has been found that treatment with the trisodium or tripotassium orthophosphate gave essentially the same effectiveness as sodium hydroxide or phosphoric acid/sodium hydroxide without the adverse effects on the meat or skin which accompany the use of the sodium hydroxide or phosphoric acid/sodium hydroxide blend.

By the use of this process, poultry carcasses can be washed economically and simply with food grade products to achieve salmonellae control without organoleptic depreciation of the carcass. Phosphate salts can remain on the poultry surface to provide a surface less conducive to supporting bacterial growth, particularly in the highly irregular surfaces of the skin without fear of carcass degradation or impairment of flavor.

Other benefits will become apparent from the description which follows.

DETAILED DESCRIPTION OF THE INVENTION

Trialkali metal phosphate is an orthophosphate salt of the formula $R_3PO_4$ with a formula for the sodium salt being $Na_3PO_4$ and an equivalent formula for the tripotassium compounds. R is a alkali metal of sodium or potassium. Trisodium phosphate has a minimum of 41.5% $P_2O_5$ and a typical pH in a 1% solution of about 11.8.

Trisodium phosphate is also available as the dodecahydrate of the formula:

$$Na_3PO_4.12H_2O$$

In commerce, the dodecahydrate is available in a technical grade with a formula of:

$$5(Na_3PO_4.12H_2O) \cdot NaOH;$$

or in the food grade with a formula of:

$$4(Na_3.12H_2O) \cdot NaOH.$$

Both forms have a typical pH in 1% solution of 11.8. Preferably, the trisodium phosphate dodecahydrate (either form) is used. As used herein, trisodium phosphate is intended to include tripotassium phosphate as well as all forms of those compounds. Food grade products are intended to be used for food uses.

The invention is applicable to all types of poultry including chickens, turkeys, geese, capon, cornish hens, squab, ducks, guinea, fowl and pheasants. By poultry or carcass, it is intended to cover whole birds as well as parts.

The application of an aqueous trialkali orthophosphate solution of pH greater than 11.5 can be made at any point in the process. We prefer however to employ the orthophosphate solution in a manner which allows recovery of the solution after treating the poultry. The recovered solution is then filtered to remove insolubles and water and trialkali metal orthophosphate added to maintain the concentration at an effective amount to remove, reduce or retard bacteriological contamination of the poultry. The poultry can either be subjected to contact with the treatment solution in a trough or may be subjected to solution sprayed inside and outside the poultry depending on where in the process treatment is made. The poultry may be treated at several points in the process to further remove, reduce or retard bacteria contamination or growth on the poultry.

It is possible to employ a trough through which the poultry is transported by chain shackles or a spray through nozzles for from several seconds to minutes Residual treatment solution remains after the actual contact with the poultry and such residual solution is further effective in removing, reducing or retarding bacterial contamination and/or growth.

While treatment can be conducted at various places in the poultry treatment process we prefer several places where we can minimize the quantity of treatment solution employed, minimize the treatment time to that effective to produce the desired removal, reduction or retardation of bacteriological growth and/or contamination of the poultry. After scalding the poultry during a feather removal we have found we may treat the poultry in a trough for a minimum of several seconds at a temperature of about 50°-60° C. prior to the singe step of processing. This helps reduce bacterial contamination. The treatment solution is removed in the subsequent washing step prior to evisceration. While it is possible to treat with orthophosphate during washing, the large quantity of water employed and regulations regarding the recycling of wash water preclude economical treatment. However, treatment is possible either directly after washing and before evisceration or after evisceration preferably employing a spray treatment solution at a temperature between 20° C. to 45° C. When treating after evisceration, it is possible to spray the treatment solution on the outside as well as the inside of the eviscerated poultry. Treatment can take several seconds or longer with the treatment solution remaining on the poultry until its introduction into the chill tank. It is also possible to employ a post chill treatment with trialkali orthophosphate solution maintained at below 27° C., preferably below 10° C. The solution may be applied in a trough or tank but is preferably sprayed on the inside and outside of the poultry. The treatment solution is then recovered and recycled while solids are removed using filters and make up water and phosphate added to maintain orthophosphate concentration.

We have found that trace amounts of the treatment solution can remain on the poultry (a few hundredths of a percent) to further remove, reduce or retard bacterial contamination and/or growth of the poultry. A further treatment can be made after cutting and prior to packaging of the poultry using either a spray or dip process.

We have found that anywhere from one second to two hours of treatment is effective in removing, reducing or retarding bacterial contamination, particularly salmonella on poultry. The time need only be an effective amount of time to produce the desired result and can easily be determined for this particular point in the process where treatment is conducted.

Equipment for recycling and removing solids is generally available from manufactures of meat pickling equipment. In general a rotary filter manufactured by Townsend of DeMoines, IA can be used to remove large particles while a screening system also available from Townsend can be used for smaller particle removal. The equipment should be made for stainless steel, plastic or other material resistant to the corrosive action of trialkali metal orthophosphate.

We prefer to employ saturated solutions of the orthophosphate which are highly effective in removing, reducing or retarding bacterial contamination. Saturated solutions of up to 40% or greater trialkali metal orthophosphate based on he weight of the solution, with the proviso that the treatment solution does not contain alcohol are possible but usually from about 4%, preferably about 8% or greater of trisodium orthophosphate is effective. The phosphate may be combined with other materials if desired with the proviso that alcohols (ethanol or the like) and reducing agents like ascorbic acid are not employed. In other words, the treatment solution does not contain alcohol. We do not employ any antibacterial which are detrimental to the organoleptic properties of the poultry such as high concentrations of sodium hydroxide or other harsh alkali or alcohol. We prefer to employ the trialkali metal phosphate per se to treat the carcass. Dispersions of orthophosphate can be used but appear to have little advantage over use of a solution for treating the carcass.

Where the chicken is treated just prior to packaging, it is possible to treat with orthophosphate combined with other materials so long as alcohol is not present. In processing before or after evisceration but before cutting, we prefer to employ trialkali metal orthophosphate per se or at least with the proviso that alcohol is not employed.

In spraying the treatment solution on the poultry we employ from 20 to 150 psi to cause a spray of medium particle size to impact the inside and outside of the poultry with sufficient force for good cleaning without any depreciation on the appearance or taste of the poultry.

After the processing of the poultry to defeather and eviscerate, the carcass is washed with water or other acceptable cleaning solutions. Agitation, sonification and other mechanical means can be applied to assist in washing. Preferably, the carcass is then treated with a treatment solution containing from about 4% to about 12% and preferably from about 6% to about 12% and most preferably from about 8% to about 12% by weight trialkali metal orthophosphate based on the weight of the solution. The carcasses can be dipped in the treatment solution. If so, the carcass or the solution is preferably agitated to insure a good flow of the treatment solution over all surfaces and in all crevices of the carcass. The treatment solution can also be applied by mechanical sprayers, preferably under high pressure to insure good contact. Sonification may be employed at either sonic or ultrasonic frequencies. Any other means of contacting the poultry with the treatment solution, such as in a rotating drum, can also be used. The treatment can also be included in the usual chill tank treatment of the poultry. The treatment solution preferably contains only trialkali metal orthophosphate. The treatment solution does not contain alcohol.

The treatment solution is preferably comprised only of trialkali metal orthophosphate. For purposes of adjusting pH, minor amounts of other agents can also be added. These can be illustrated by sodium carbonate, sodium and/or potassium hydroxide, alkali metal polyphosphate such as, sodium tripolyphosphate or acids such as phosphoric acid. Since hydroxides have an adverse effect on the organoleptic characteristics of the poultry flesh, it is preferred to avoid the use of these basic agents altogether or to use amounts which have no effect on the organoleptic characteristics of the poultry flesh. The basic agent, if used, is used in an amount insufficient with the alkali metal orthophosphate to cause organoleptic deterioration of the poultry flesh. By "minor amounts" is meant less than 50% by weight of the combined dry weight of the trialkali metal orthophosphate and the basic agent usually up to 45% and in all cases in an amount insufficient to cause organoleptic deterioration.

The ingredients in the treatment solution are used in amounts sufficient to provide a pH of above about 11.5 and preferably within the range from about 11.6 to about 13.0. The pH level insures the treatment solution will remove, reduce or retard bacterial contamination or growth. We prefer to employ equipment which recycles the solution for economy, filters solids from the recycled solution for cleanliness, adds make up water to maintain the solutions volume and adds trialkali metal orthophosphate to maintain a saturated or near saturated solution While a saturated solution insures maximum concentration of the phosphate, we have found that concentrations of about 4% to saturation and more particularly about 8% to near saturation are desirable. At cooler temperatures, below 27° C. and 10° C. a solution containing about 4% to about 12% trialkali metal orthophosphate and more preferably about 6% or more and most preferably about 8% or more is effective to reduce, remove or retard contamination and/or growth of bacteria especially salmonella in poultry processing. At all levels of about 4% or more trialkali orthophosphate, the pH will remain above about 11.5 and preferably from pH 11.6 to about 13.5, most preferably 12.0–13.5.

The treatment is conducted under good poultry processing conditions. Cool temperatures and cool treatment solutions are used after chilling the eviscerated poultry to avoid undue deterioration of the meat. The treatment solution temperature post-chill is preferably less than 27° C., more preferably less than 10° C.

The poultry carcasses are contacted with the treatment solution for a period of time sufficient to reduce bacterial contamination over and above that obtainable with pure water. Treatment dwell time is also sufficient, under the conditions of the treatment, to contact all contactable exposed surfaces of the poultry carcasses, effect a washing of the surfaces and thus contact substantially all colony forming units on the surface of the poultry. The contact time is sufficient to allow upon drying, the deposition of an even layer of trialkali metal orthophosphate on the exposed surfaces of the poultry to prevent or retard further bacterial growth.

At atmospheric pressure, in a dip tank, dwell times ranging from a few seconds such as two or more seconds after the scald tank and after about 30 seconds to about 30 minutes where processing conditions permit have been found to be effective. Dwell times can be reduced using a pressure spray. Longer dwell times can be used if the solution concentration is not excessive.

Pressure spraying is particularly useful when both the inside and outside of the eviscerated poultry can be treated We employ a rotating nozzle for the inside spray and insert the nozzle fully into the cavity resulting from evisceration so that all parts of the exposed flesh, tissue and bone is contacted with a spray of treatment solution. Outside sprays are designed to cover the total outside of the poultry. When treatment is employed after poultry pieces are cut, we employ a spray to cover all surface area. Where possible we allow the treatment solution to remain on the poultry to further reduce, remove or retard bacterial contamination and/or growth. Often we allow the solution to dry on the poultry to further reduce, remove or retard bacterial growth.

The spray is propelled using from 20 to 150 psi pressure through spray nozzles designed to vigorously wash the surface without damaging the meat.

When using dip tanks or troughs the poultry is generally pulled through the solution using a chain and shackle system. Although this method, which permits the phosphate treatment solution to contact the entire poultry surface is suitable, agitation in such tanks will improve contact of poultry and solution and normally reduces the time of contact required for good results.

Immediately after treatment, the poultry can be processed following normal processing conditions such as draining and chilling. A unique feature of the invention is the ability to allow the trialkali metal phosphate to dry on the surface of the poultry without the need to wash. It is therefore preferred to combine trialkali metal phosphate wash at some point after the chill tank. The residual phosphate left on the poultry surface provides reduced bacteriological activity particularly in the cracks and pockets of the skin.

While it is possible to treat the poultry at any point in the process and at any temperature and time which does not harm the product, we have identified several areas where we believe the treatment will be most effective. One or more treatments with the alkali metal orthophosphate during processing are possible and often desirable. Any treatment temperature from 0°–70° C. for process times of several seconds to hours depending on the temperature is feasible.

After scalding and before defeathering, treatment provides a means of washing undesired contamination including bacterial contamination from the poultry as well as providing a coating of treatment solution on the poultry as it is exposed to defeathering where further bacterial contamination can occur. This treatment is conducted at 40°–70° C., preferably 45°–65° C. for a short period of time.

It is also possible to treat the poultry after defeathering and before evisceration although we prefer to treat after evisceration where both the inside and outside of the poultry may be thoroughly sprayed with treatment solution at 20°–40° C., preferably 25°–35° C. and allow the treatment solution to remain on the bird entering the chill equipment.

It is also preferred to treat the poultry post-chilling with a treatment spray inside and outside of the poultry. This step helps remove any undesired material present in the chill tank and treats any additional bacteria which may have contacted the poultry in the chill tank. Again we prefer to allow the solution to remain on the poultry including drying and after packaging. Where cutting of the processed poultry is done, we can treat the cut poultry with trialkali metal orthophosphate solution and then wash the poultry or pack the parts as is.

Leaving the treatment solution on the poultry provides a further opportunity to remove, reduce or retard bacterial contamination and/or growth on the poultry including packaged poultry.

While the present invention is primarily directed at reducing salmonella contamination of the poultry, it is also intended to include all bacterial growth which is affected by the stated trialkali metal orthophosphates. In addition to salmonellae, other bacteria which are measured by total plate count are significantly reduced.

Affected bacterial species can be easily determined by one of ordinary skill and thus all such bacteria as are affected are considered included in the invention.

The present invention will be illustrated in the Examples which follow. The poultry used in the Examples 1–13 are conventional chicken broiler stock weighing dressed from about 0.9 to about 1.1 kilograms.

EXAMPLES 1–6

Grade A broilers from a processing plant after rinsing and before being chilled in the chill tank were packed in coolers with "$CO_2$ snow", transported, separated and placed on ice and kept in a 1.1° C. (34° F.) cooler overnight. The birds were dipped for 1 minute in an inoculum of $10^7$–$10^8$ CFU/ml of a freshly grown nalidixic acid resistant strain of *Salmonella typhimurium* harvested from BHI broth and then allowed to drain for a specific time. After the allotted draining time, 5 broilers were submerged and agitated in each treatment solution for a specified dwell time. Each agent was placed in a separate tared clean plastic container. Water and ice were added until 20.4 kilograms was obtained with a temperature of approximately 7.2° C. (45° F.). One inoculated broiler was immersed in water as control and one inoculated bird was retained without washing as a control.

After treatment, the birds were individually placed in Cryovac plastic bags and were either analyzed immediately (two birds plus the inoculated control) or placed in a 2.2° C. (36° F.) incubator to determine the effect of treatment after storage. Two broilers were analyzed for each treatment after 5 and 8 days storage at 2.2° C. (36° F.). Thus seven birds were used for each treatment. The following conditions were used:

TABLE I

| Example | Treatment Agent | Amount /20.4 Kg | Inoculum Drain Time | Treatment Dwell Time |
|---|---|---|---|---|
| 1 | $Na_3PO_4$ | 2.4 kg | 2 minutes | 30 seconds |
| 2 | $Na_3PO_4$ | 0.78 kg | 1 hour | 15 minutes |
| 3 | $Na_3PO_4$ | 1.6 kg | 2 minutes | 15 minutes |
| 4 | $Na_3PO_4$ | 1.59 kg | 1 hour | 15 minutes |
| 5 | 50% $Na_3PO_4$ *50% STP | 1.59 kg | 1 hour | 15 minutes |
| 6 | Water | 0.0 | 2 minutes | 15 minutes |

*STP means sodium tripolyphosphate

ENUMERATION OF NALIDIXIC ACID-RESISTANT SALMONELLA

Nalidixic acid-resistant salmonellae were enumerated using the whole carcass wash procedure as prescribed by the National Broiler Council. Each bird was weighed and the resulting weight was divided by 3.8 to determine the number of ml of lactose broth plus 0.6% tergitol to be added to the bag. The bird, broth, and bag were shaken for 1 minute through an arc of 2 ft in a manner assuring that the broth flowed through the abdominal cavity and over the entire surface of the carcass. Serial dilutions of this broth in Butterfield's buffer were plated using the pour plate procedure with MacConkey's agar with 100 ppm nalidixic acid added. These plates were incubated for 48 hours at 35° C. then counted. Nalidixic acid-resistant colonies were selected and confirmed as Salmonella using FDA Bacteriological Analytical Manual (BAM) Procedures.

As a backup procedure to assure recovery of sublethally injured nalidixic acid-resistant salmonella, a 10 ml aliquot of the lactose broth, 0.6 percent tergitol carcass wash was pipetted into a sterile culture tube and incubated for 24 hours at 35° C. In the event that no growth occurred on the MacConkey Agar/nalidixic acid plates, the backup wash was examined for the presence of salmonellae using FDA BAM procedures.

The results achieved are shown in Table II which follows. The data for storage at 2.2° C. (36° F.) for 0, 5 and 8 days, is compared to an inoculated control which has been washed only with water.

TABLE II

Efficacy[a] of Treatments of Examples 1 through 6 against a nalidixic acid-resistant *Salmonella typhimurium* inoculated onto fresh broiler carcasses.

| 2.2 (36° F.) Storage Time (Days) | | Duplicate A | Duplicate B | Mean CFU per ml[a] | Log CFU per ml | Pct. Reduction |
|---|---|---|---|---|---|---|
| | | Duplicates CFU per ml[a] | | | | |
| Example 1 | | | | | | |
| 0 | a | $1.9 \times 10^5$ | $7.7 \times 10^2$ | $8.4 \times 10^4$ | 4.92 | 99.2 |
| | b | $6.8 \times 10^4$ | $1.0 \times 10^3$ | | | |
| 5 | a | $9.2 \times 10^3$ | $6.4 \times 10^3$ | $7.4 \times 10^3$ | 3.87 | 99.9 |
| | b | $8.2 \times 10^3$ | $5.6 \times 10^3$ | | | |
| 8 | a | $8.1 \times 10^3$ | $9.0 \times 10^3$ | $8.1 \times 10^3$ | 3.91 | 99.9 |
| | b | $8.7 \times 10^3$ | $6.4 \times 10^3$ | | | |
| Untreated Control | — | — | $1.0 \times 10^7$ | $1.1 \times 10^7$ | $1.1 \times 10^7$ | 7.04 | — |
| Example 2 | | | | | | |
| 0 | a | $9.0 \times 10^1$ | $7.0 \times 10^4$ | $6.3 \times 10^4$ | 4.80 | 99.5 |
| | b | $5.0 \times 10^1$ | $1.8 \times 10^5$ | | | |
| 5 | a | $2.0 \times 10^4$ | $9.6 \times 10^3$ | $1.4 \times 10^4$ | 4.14 | 99.9 |
| | b | $1.9 \times 10^4$ | $6.4 \times 10^3$ | $6.4 \times 10^3$ | | |
| 8 | a | $7.8 \times 10^3$ | $2.2 \times 10^4$ | $1.6 \times 10^4$ | 4.19 | 99.9 |
| | b | $7.7 \times 10^3$ | $2.5 \times 10^4$ | | | |
| Untreated Control | — | — | $1.2 \times 10^7$ | $1.2 \times 10^7$ | $1.2 \times 10^7$ | 7.08 | — |
| Example 3 | | | | | | |
| 0 | a | $1.0 \times 10^2$ | $1.3 \times 10^2$ | $8.3 \times 10^1$ | 1.92 | 99.999 |
| | b | $3.0 \times 10^1$ | $7.0 \times 10^1$ | | | |
| 5 | a | $5.7 \times 10^2$ | $1.4 \times 10^3$ | $2.4 \times 10^3$ | 3.38 | 99.98 |
| | b | $3.8 \times 10^2$ | $7.2 \times 10^3$ | | | |
| 8 | a | $2.2 \times 10^3$ | $3.3 \times 10^3$ | $3.2 \times 10^3$ | 3.51 | 99.98 |
| | b | $1.9 \times 10^3$ | $3.3 \times 10^3$ | | | |
| Untreated Control | — | — | $1.5 \times 10^7$ | $1.5 \times 10^7$ | $1.5 \times 10^7$ | 7.18 | — |
| Example 4 | | | | | | |
| 0 | a | $2.0 \times 10^1$ | $1.8 \times 10^2$ | $8.5 \times 10^1$ | 1.93 | 99.999 |
| | b | $6.0 \times 10^1$ | $8.0 \times 10^1$ | | | |
| 5 | a | $2.1 \times 10^3$ | $8.8 \times 10^3$ | $3.4 \times 10^3$ | 3.53 | 99.98 |
| | b | $2.6 \times 10^3$ | $1.2 \times 10^2$ | | | |

TABLE II-continued

Efficacy[a] of Treatments of Examples 1 through 6 against a nalidixic acid-resistant *Salmonella typhimurium* inoculated onto fresh broiler carcasses.

| | 2.2 (36° F.) Storage Time (Days) | | Duplicate A | Duplicate B | Mean CFU per ml[a] | Log CFU per ml | Pct. Reduction |
|---|---|---|---|---|---|---|---|
| | | | Duplicates CFU per ml[a] | | | | |
| | 8 | a | $9.0 \times 10^2$ | $1.8 \times 10^3$ | $1.3 \times 10^3$ | 3.11 | 99.99 |
| | | b | $1.1 \times 10^3$ | $1.3 \times 10^3$ | | | |
| Untreated Control | — | — | $1.9 \times 10^7$ | $1.3 \times 10^7$ | $1.6 \times 10^7$ | 7.20 | — |
| Example 5 | | | | | | | |
| | 0 | a | $3.0 \times 10^1$ | $6.0 \times 10^1$ | $3.3 \times 10^1$ | 1.51 | 99.999 |
| | | b | $1.0 \times 10^1 (+)$ | $4.0 \times 10^1$ | | | |
| | 5 | a | $2.1 \times 10^3$ | $4.3 \times 10^3$ | $2.6 \times 10^3$ | 3.41 | 99.98 |
| | | b | $1.6 \times 10^3$ | $2.4 \times 10^3$ | | | |
| | 8 | a | $2.0 \times 10^3$ | $4.9 \times 10^2$ | | | |
| Untreated Control | — | — | $1.0 \times 10^7$ | $1.1 \times 10^7$ | $1.1 \times 10^7$ | 7.04 | — |
| Example 6 | | | | | | | |
| | 0 | a | $7.9 \times 10^5$ | $5.9 \times 10^5$ | $7.4 \times 10^5$ | 5.87 | 90.9 |
| | | b | $1.0 \times 10^6$ | $5.7 \times 10^5$ | | | |
| | 5 | a | $4.1 \times 10^5$ | $6.5 \times 10^5$ | $5.2 \times 10^5$ | 5.72 | 93.6 |
| | | b | $4.3 \times 10^5$ | $5.9 \times 10^5$ | | | |
| | 8 | a | $3.1 \times 10^5$ | $4.0 \times 10^5$ | $4.0 \times 10^5$ | 4.60 | 95.1 |
| | | b | $4.3 \times 10^5$ | $4.5 \times 10^5$ | | | |
| Untreated Control | — | — | $5.2 \times 10^6$ | $1.1 \times 10^7$ | $8.1 \times 10^6$ | 6.91 | — |

[a] Colony Forming Units per ml of carcass wash.
(+) Back up confirmed positive for nalidixic acid-resistant salmonellae.

DISCUSSION OF RESULTS

The inoculum suspension averaged $1.6 \times 10^8$ CFU per ml nalidixic acid-resistant Salmonella typhimurium. Uninoculated, untreated control broilers averaged 380 nalidixic acid-resistant salmonellae per ml. This number is considered insignificant in light of the inoculum level used in the experiment. Untreated inoculated controls averaged $1.2 \times 10^7$ CFU per ml nalidixic acid-resistant salmonellae.

Treatment of inoculated carcass with water wash only (Example 6) gave reductions of 90.9 to 95.1 percent (approximately 1 log-cycle). Therefore, the water rinse by itself removed approximately 90 percent of the nalidixic acid-resistant salmonellae.

The treatments of Examples 1 and 2 both gave reductions in the 99 to 99.9 percent range (2 to 3 log cycles). Thus the higher concentration and short dwell time of the treatment of Example 1 was approximately equivalent to the lower concentration longer dwell time of the treatment of Example 2.

The treatments of Examples 3 and 4 both gave 99.999 percent (5 log cycle) reductions immediately after treatment (Time 0) as compared to inoculated untreated controls. However, reductions were 99.98 or 99.99 (approximately 4 log cycles) for samples stored for 5 or 8 days at 3.3° C. (38° F.). This may indicate that injured cells not recovered by plating immediately after treatment may be able to effect repair during refrigerated storage. The increased recovery numbers do not indicate growth since salmonellae will not grow at temperatures less than 7.2° C. (45° F.).

The treatment of Example 5 gave a reduction of 99.9998 (nearly 6 log-cycles) immediately after treatment. Again, there was increased recovery of nalidixic acid-resistant salmonellae at 5 and 8 days compared to immediately after treatment.

EXAMPLES 7-13

Broilers randomly selected from the chill tank and transported on wet ice were treated as in Example 1. Seven treating solutions were prepared, 3 as per the invention and 4 controls. Eleven chickens were dipped at one time in the inoculum for 1 minute and allowed to drain for a specific time. Ten of these broilers were submerged in a specific agent for the time given in Table III. One inoculated broiler was retained as an inoculated untreated control. The birds were placed in Cryovac bags and stored as in Example 1. Duplicate broilers were analyzed for each treatment after 5 and 7 days storage at 2.2° C. (36° F.) and after 3 and 5 days storage at 12.8° C. (55° F.). Enumeration of salmonellae was as described in Example 1. The following conditions were used:

TABLE III

| Example | Treatment Agent | Amount /20.4 Kg | Conc. | Inoculum Drain Time | Treatment Dwell Time (Minutes) |
|---|---|---|---|---|---|
| 7 | $Na_3PO_4$ | 2.45 kg | 12% | 2 minutes | 2.0 |
| 8 | $Na_3PO_4$ | 1.6 kg | 8% | 1 hour | 15.0 |
| 9 | $Na_3CO_3$ | 1.6 kg | 8% | 1 hour | 15.0 |
| 10 | NaOH | 0.2 kg | 1% | 1 hour | 15.0 |
| 11* | 75% $H_3PO_4$ | 0.54 kg | 2.6% | 1 hour | 7.5 |
| | 25% NaOH | 0.41 kg | 2% | 1 hour | 7.5 |
| 12* | 75% $H_3PO_4$ | 0.54 kg | 2.6% | 1 hour | 7.5 |
| | 25% $Na_2CO_3$ | 1.63 kg | 8% | 1 hour | 7.5 |

TABLE III-continued

| Example | Treatment Agent | Amount /20.4 Kg | Conc. | Inoculum Drain Time | Treatment Dwell Time (Minutes) |
|---|---|---|---|---|---|
| 13 | Water | — | — | 2 minutes | 15.0 |

*Examples 11 and 12 were run using two separate baths and two separate dwell times as listed.

The results are shown in Table IV.

TABLE IV

Efficacy of treatments of Examples 7 through 13 against a nalidixic acid-resistant *Salmonella typhimurium* inoculated onto fresh broiler carcasses held at 2.2° C.

| Treatment | 2.2° C. Storage Time (days) | Replicates CFU per ml[a] | | Mean CFU per ml | Log CFU per ml | Pct. Reduction |
|---|---|---|---|---|---|---|
| | | | B | | | |
| Example 7 | | | | | | |
| | 0 | $2.05 \times 10^3$ | $1.21 \times 10^3$ | $1.6 \times 10^3$ | 3.20 | 99.997 |
| | 5 | $3.35 \times 10^5$ | $6.85 \times 10^4$ | $2.0 \times 10^5$ | 5.30 | 99.69 |
| | 7 | $1.35 \times 10^4$ | $5.5 \times 10^3$ | $9.5 \times 10^3$ | 3.98 | 99.985 |
| Untreated Control | 0 | $6.45 \times 10^7$ | — | $6.5 \times 10^7$ | 7.81 | |
| Example 8 | | | | | | |
| | 0 | $3.15 \times 10^2$ | $7 \times 10^1$ | $1.92 \times 10^2$ | 2.28 | 99.9993 |
| | 5 | $1.9 \times 10^5$ | $0 \times 10^2$ | $1.92 \times 10^5$ | 5.28 | 99.366 |
| | 7 | $3.9 \times 10^6$ | $1.75 \times 10^6$ | $2.83 \times 10^6$ | 6.45 | 90.66 |
| Untreated Control | 0 | $3.0 \times 10^7$ | — | $3.0 \times 10^7$ | 7.48 | |
| Example 9 | | | | | | |
| | 0 | $6.3 \times 10^3$ | $3.8 \times 10^2$ | $3.3 \times 10^3$ | 3.52 | 99.991 |
| | 5 | $4.4 \times 10^3$ | $7.5 \times 10^2$ | $2.6 \times 10^3$ | 3.41 | 99.993 |
| | 7 | $1.5 \times 10^1$ | $2.6 \times 10^2$ | $1.4 \times 10^2$ | 2.14 | 99.9996 |
| Untreated Control | 0 | $3.75 \times 10^7$ | — | $3.8 \times 10^7$ | 7.57 | |
| Example 10 | | | | | | |
| | 0 | $7.0 \times 10^1$ | $4.25 \times 10^2$ | $2.5 \times 10^2$ | 2.39 | 99.9997 |
| | 5 | $2.75 \times 10^7$ | $8.4 \times 10^7$ | $5.6 \times 10^7$ | 7.75 | 42.27 |
| | 7 | $8.95 \times 10^4$ | $3.75 \times 10^6$ | $1.9 \times 10^6$ | 6.28 | 98.04 |
| Untreated Control | 0 | $9.7 \times 10^7$ | — | $9.7 \times 10^7$ | 7.99 | — |
| Example 11 | | | | | | |
| | 0 | $1.0 \times 10^1$ | $6 \times 10^1$ | $3 \times 10^1$ | 1.477 | 99.999 |
| | 5 | $-1.34 \times 10^7$ | $4.1 \times 10^7$ | $2.7 \times 10^7$ | 7.43 | 35.71 |
| | 7 | $1.35 \times 10^3$ | $5.45 \times 10^3$ | $3.4 \times 10^3$ | 3.53 | 99.9919 |
| Untreated Control | 0 | $4.2 \times 10^7$ | — | $4.2 \times 10^7$ | 7.62 | — |
| Example 12 | | | | | | |
| | 0 | $5.55 \times 10^3$ | $1.7 \times 10^3$ | $3.6 \times 10^3$ | 3.56 | 99.987 |
| | 5 | $1.6 \times 10^6$ | $1.35 \times 10^6$ | $1.5 \times 10^6$ | 6.19 | 94.83 |
| | 7 | $1.3 \times 10^3$ | $3.7 \times 10^5$ | $1.9 \times 10^5$ | 5.27 | 99.34 |
| Untreated Control | 0 | $2.85 \times 10^7$ | — | $2.9 \times 10^7$ | 7.45 | — |
| Example 13 | | | | | | |
| | 0 | $4.0 \times 10^6$ | $1.25 \times 10^6$ | $2.6 \times 10^6$ | 6.42 | 92.777 |
| | 5 | $1.55 \times 10^8$ | $1.65 \times 10^8$ | $1.6 \times 10^8$ | 8.20 | no reduction |
| | 7 | $2.05 \times 10^6$ | $8.65 \times 10^5$ | $1.5 \times 10^6$ | 6.16 | 95.83 |
| Untreated Control | 0 | $3.6 \times 10^7$ | — | $3.6 \times 10^7$ | 7.56 | — |

The untreated controls were prepared by dipping the carcass in inoculum and draining for the same period as the treated sample. The enumeration of nalidixic acid-resistant salmonellae was conducted without storage.

TABLE V

Percentage reductions of nalidixic acid-resistant salmonellae due to various treatments[1] followed by storage at 2.2° C. for 0, 5, and 7 days. Compiled from Table IV.

| Time (Days) | 0 | 0 | 0 | 0 | 0 | 0 | 0 |
|---|---|---|---|---|---|---|---|
| Example | 10 | 8 | 11 | 7 | 9 | 12 | 13 |
| Pct. Reduction | 99.9997 | 99.9993 | 99.9990 | 99.997 | 99.991 | 99.987 | 92.777 |
| Time (Days) | 5 | 5 | 5 | 5 | 5 | 5 | 5 |
| Example | 9 | 7 | 8 | 12 | 10 | 11 | 13 |
| Pct. Reduction | 99.993 | 99.69 | 99.366 | 94.83 | 42.27 | 35.71 | — |
| Time (Days) | 7 | 7 | 7 | 7 | 7 | 7 | 7 |

TABLE V-continued

Percentage reductions of nalidixic acid-resistant salmonellae due to various treatments[1] followed by storage at 2.2° C. for 0, 5, and 7 days. Compiled from Table IV.

| Example | 9 | 11 | 7 | 12 | 10 | 13 | 8 |
|---|---|---|---|---|---|---|---|
| Pct. Reduction | 99.9996 | 99.9919 | 99.985 | 99.34 | 98.04 | 95.83 | 90.66 |

[1]Treatments listed in descending order of effectiveness for a given storage time.

TABLE VI

Efficacy of treatments of Examples 7 through 13 against a nalidixic acid-resistant *Salmonella typhimurium* inoculated onto fresh broiler carcasses held at 12.8° C.

| Example | 12.8° C. Storage Time (days) | Replicates Mean of 2 dup. CFU per ml. | | Mean CFU per ml | Log CFU per ml | Pct. Reduction |
|---|---|---|---|---|---|---|
| 7 | 3 | $2.9 \times 10^5$ | $2.9 \times 10^5$ | $2.9 \times 10^5$ | 5.46 | 99.55 |
|   | 5 | $6.85 \times 10^2$ | $2.45 \times 10^6$ | $1.2 \times 10^6$ | 6.09 | 98.15 |
| 8 | 3 | $6.95 \times 10^4$ | $1.9 \times 10^4$ | $4.4 \times 10^4$ | 4.65 | 99.85 |
|   | 5 | $1.02 \times 10^6$ | $2.05 \times 10^2$ | $5.1 \times 10^5$ | 5.71 | 98.3 |
| 9 | 3 | $2.35 \times 10^2$ | $3.95 \times 10^4$ | $2.0 \times 10^4$ | 4.30 | 99.947 |
|   | 5 | $1 \times 10^1$ | $1 \times 10^1$ | $1.0 \times 10^1$ | 1 | 99.999 |
| 10 | 3 | $1.11 \times 10^6$ | $2.7 \times 10^6$ | $1.9 \times 10^6$ | 6.28 | 98.04 |
|    | 5 | $4.57 \times 10^3$ | $1.9 \times 10^5$ | $9.7 \times 10^4$ | 4.99 | 99.9 |
| 11 | 3 | $3.65 \times 10^6$ | $2.45 \times 10^6$ | $3.1 \times 10^6$ | 6.48 | 92.62 |
|    | 5 | $7.95 \times 10^3$ | $8.55 \times 10^2$ | $4.4 \times 10^3$ | 3.64 | 99.989 |
| 12 | 3 | $2.3 \times 10^4$ | $6.0 \times 10^5$ | $3.1 \times 10^5$ | 5.49 | 98.93 |
|    | 5 | $6.3 \times 10^2$ | $3.95 \times 10^2$ | $5.1 \times 10^2$ | 2.71 | 99.998 |
| 13 | 3 | $6.7 \times 10^6$ | $5.85 \times 10^6$ | $6.3 \times 10^6$ | 6.80 | 82.5 |
|    | 5 | $2.5 \times 10^6$ | $1.1 \times 10^7$ | $6.75 \times 10^6$ | 6.83 | 81.1 |

TABLE VII

Percentage reductions[1] of nalidixic acid-resistant salmonellae due to various treatments[2] followed by storage at 12.8° C. Compiled from Tables IV and VI

| Time (days) | 0 | 0 | 0 | 0 | 0 | 0 | 0 |
|---|---|---|---|---|---|---|---|
| Example | 10 | 8 | 11 | 7 | 9 | 12 | 13 |
| Pct. Reduction | 99.9997 | 99.9993 | 99.9990 | 99.997 | 99.991 | 99.987 | 92.777 |
| Time (days) | 5 | 5 | 5 | 5 | 5 | 5 | 5 |
| Example | 9 | 8 | 7 | 12 | 10 | 11 | 13 |
| Pct. Reduction | 99.947 | 99.85 | 99.55 | 98.93 | 98.04 | 92.62 | 82.5 |
| Time (days) | 7 | 7 | 7 | 7 | 7 | 7 | 7 |
| Example | 9 | 12 | 11 | 10 | 8 | 7 | 13 |
| Pct. Reduction | 99.999 | 99.998 | 99.989 | 99.90 | 98.3 | 98.15 | 81.10 |

[1]Treatments listed in descending order of effectiveness for a give storage time.
[2]Zero time data is listed in Table IV. Data for 3 and 5 days storage at 12.8° C. is listed in Table VI.

DISCUSSION OF RESULTS

For Examples 7-13, untreated inoculated controls averaged $4.8 \times 10^7$ CFU nalidixic acid-resistant *Salmonella typhimurium* per ml of carcass wash (Table IV). No nalidixic acid-resistant salmonellae were detected in uninoculated, untreated controls (not listed).

Table IV lists results of enumeration of nalidixic acid-resistant salmonellae from carcass rinse solutions for inoculated broilers subjected to the seven test treatments at 0 days storage and at 5 and 7 days storage at 2.2° C. Table V lists the percent reduction in numbers of nalidixic acid-resistant *Salmonella typhimurium* for each treatment in order of greatest effectiveness at a given storage time (0, 5, or 7 days) at 2.2° C. At time 0, treatments of Examples 10, 8 and 11 were most effective immediately producing 99.9997, 99.9993, and 99.9990 percent reductions, respectively. However, at day 5 the percent reduction for the treatments of Examples 10, 8 and 11 were 42.27, 99.366, and 35.71, respectively. At day 7, the percentage reductions were 98.04, 90.66 and 99.9919, respectively, for the treatments of Example 10, 8 and 11. These observations reflect recovery of sublethally injured cells during refrigerated storage rather than outgrowth of salmonellae during refrigerated storage at 2.2° C.

Table VI lists results of enumeration of nalidixic acid-resistant salmonellae from carcass rinse solutions for inoculated broilers subjected to the 7 treatments, then subsequently stored at 12.8° C. for 3 or 5 days. Initial (day 0) counts are listed in Table IV. The percentage reductions from Table VII for carcasses stored at 12.8° C. are listed in Table VII together with the initial (day 0) reduction from Table IV to facilitate comparison. Note that the recovery of injured cells observed at 2.2° C. also occurs at 12.8° C. Again, no growth is evident during the time period of this study, even at the 12.8° C. storage temperature, which reflects moderate to severe temperature abuse.

One important situation not reflected in the microbiological data is the fact that for the sodium hydroxide treatments of Examples 10 and 11, severe sloughing of broiler skin occurred, resulting in a very unacceptable appearance. Both of these treatments are undesirable for commercial use.

The treatments of Examples 7 and 8, both of which involved the use of $Na_3PO_4.12H_2O$, were essentially as effective as the treatments of Examples 10 (sodium hydroxide) and 11, (phosphoric acid and sodium hydroxide) without the accompanying adverse effects on appearance of the broiler carcasses. The treatments of Examples 7 and 8 involving the use of $Na_3PO_4.12H_2O$ gave an approximately one log cycle greater kill initially that did the treatments of Examples 9 ($Na_2CO_3$) and 12 (75% $H_3PO_4$)/$Na_2CO_3$, both of which involved the use of $Na_2CO_3$. However, the percent reduction for the treatment of Example 9 ($Na_2CO_3$) increased with storage at 2.2° C., so that it had the greatest percent reduction after 5 and 7 days storage at 2.2° C., of any of the 7 treatments (Table V). These trends were essentially the same for the studies conducted at 12.8° C.

EXAMPLES 14-22

Two grade A broilers at a time were removed from a processing plant after an inside and outside spray body wash just prior to the chill tanks. These are referred to as pre-chill birds. The birds' temperature ranged from about 35° C. to 40° C. The birds were placed in a room temperature treatment solution which was prepared that morning in the concentrations of trisodium orthophosphate indicated in the example. The birds were removed from the processing line using sterile gloves, and placed in the treatment solution for the treatment time indicated. Another person then removed the birds from the treatment solution and put the birds in a sterile plastic bag ready for assay and containing 200 ml of sterile buffer. The bag was closed and shaken for one minute following standard procedure to thoroughly contact the buffer and bird. The buffer was directed to the bottom of the bag. The outside of the bag was sterilized, a bottom corner of the bag cut and the buffer drained into a sterile bottle. The buffer was neutralized to pH 7 using hydrochloric acid and the samples sent to USDA laboratory for standard analysis. Birds were treated with 6%, 9% and 12% trisodium orthophosphate for dip times of 5 seconds, 10 seconds and 15 seconds and were sprayed inside and out for 3 seconds and 10 seconds. In spraying, the inside was sprayed for 1 second and the outside for 2 seconds or the inside was sprayed for 3 seconds and the outside for 7 seconds using a hand sprayer.

Two birds at a time were also removed on just exiting the chill tank at a temperature of 0°-10° C. and similarly treated with trisodium orthophosphate and treated for analysis in a similar way. These birds are referred to as post chill birds.

Analysis of the birds was done the first day of treatment and six days later. Two birds were treated and tested at each treatment dip or spray time at 0 days and six days giving a total of four birds for each dip or spray time. Two or three days data is available for a total of eight birds used each day for each dip or spray test condition. The raw results are given in the following tables, where test 14 is 6%, test 15 is 9%, test 16 is 12% trisodium phosphate, all for post chill treatment; test 17 is 6%, test 18 is 9% and test 19 is 12% trisodium orthophosphate all for pre-chill treatment and test 20 and 21 are post-chill treatment by spray with 12% solution of trisodium orthophosphate and example 22 is pre-chill spray treatment with 12% trisodium orthophosphate.

Examples A and B of tables VIII and IX are treatments with two days sampling for total plate count, examples C and D of tables X and XI are two days sampling for Enterobacteriacae. Examples E and F of tables XII and XIII are two days sampling for *E. coli* and examples G and H of tables XIV and XV are two days sampling for Salmonella.

Control data is included at the bottom of the tables. In any one days test, poultry from about six houses was sampled and treated perhaps accounting for the wide variation in some data.

TABLE VIII

Results (Day III) of Analysis for Total Plate Count

| | | DIP TIME | | | | | |
|---|---|---|---|---|---|---|---|
| | | 5 Seconds | | 10 seconds | | 15 seconds | |
| EXAMPLE | TREATMENT | 0 days | 6 days | 0 days | 6 days | 0 days | 6 days |
| | Post-chill | | | | | | |
| 14A | 6% | 50 | 170 | <10 | 360 | <10 | 150 |
| | | <10 | 7,300 | 30 | 140 | <10 | 330 |
| 15A | 9% | <10 | 100 | 270 | 50 | 10 | 60 |
| | | <10 | 130 | 70 | 10 | 10 | 220 |
| 16A | 12% | 10 | 3,400 | 50 | 340 | 10 | 80 |
| | | <10 | 140 | 50 | 190 | <10 | 80 |
| | Pre-chill | | | | | | |
| 17A | 6% | 520 | 570 | 480 | 1,200 | 760 | 250 |
| | | 410 | 490 | 320 | 930 | 70 | 410 |
| 18A | 9% | 240 | 340 | 4,600 | 910 | 430 | 270 |
| | | 150 | 610 | 710 | 270 | 750 | 130 |
| 19A | 12% | 440 | 330 | 160 | 550 | 500 | 5,300 |
| | | 140 | 820 | 610 | 1,100 | 260 | 260 |

| | | SPRAY TIME | | | |
|---|---|---|---|---|---|
| | | *3 seconds | | **10 seconds | |
| | | 0 days | 6 days | 0 days | 6 days |
| | Post-chill | | | | |
| 20A | 12% | 170 | 190 | — | — |
| | | 30 | 410 | — | — |
| 21A | 12% | — | — | 10 | 180 |
| | | — | — | 40 | 150 |
| | Pre-chill | | | | |
| 22A | 12% | 40 | — | — | — |

TABLE VIII-continued

Results (Day III) of Analysis for Total Plate Count

280 — — —

| Control Post-chill | | Control Pre-chill | |
|---|---|---|---|
| 0 days | 6 days | 0 days | 6 days |
| 380 | 650 | 440 | — |
| 250 | 290 | — | — |

*2 seconds outside and 1 second inside
**7 seconds outside and 3 seconds inside
NOTE: Data in table is represented as number/ml.

TABLE IX

Results (Day II) of Analysis for Total Plate Count

| | | DIP TIME | | | | | |
|---|---|---|---|---|---|---|---|
| | | 5 Seconds | | 10 seconds | | 15 seconds | |
| EXAMPLE | TREATMENT | 0 days | 6 days | 0 days | 6 days | 0 days | 6 days |
| | Post-chill | | | | | | |
| 14B | 6% | — | — | 4,100 | 160 | 11,000 | 100 |
| | | — | — | 25 | 130 | 5,100 | 380 |
| 15B | 9% | 5,000 | 570 | 3,100 | 160 | 2,100 | 90 |
| | | 4,900 | 130 | 2,700 | 800 | 2,100 | 50 |
| 16B | 12% | 2,200 | 110 | 2,200 | 920 | 1,200 | 7,000 |
| | | 2,500 | 120 | 3,600 | 470 | 2,800 | 210 |
| | Pre-chill | | | | | | |
| 17B | 6% | 4,300 | 730 | 2,000 | 920 | 1,200 | 7,000 |
| | | 310 | 930 | 200 | 32,000 | 480 | 1,000 |
| 18B | 9 | 4,700 | 430 | 760 | 610 | 500 | 1,000 |
| | | 300 | 330 | 3,500 | 2,400 | 340 | 300 |
| 19B | 12% | 400 | 140 | 510 | 240 | 400 | 320 |
| | | 1,400 | 160 | 400 | 410 | 390 | 310 |

| Control Post-chill | |
|---|---|
| 0 days | 6 days |
| 370 | 2,400 |
| 2,100 | 190 |

Note: Data in table is represented as number/ml

TABLE X

Results (Day III) of Analysis for Enterobacteriacae

| | | DIP TIME | | | | | |
|---|---|---|---|---|---|---|---|
| | | 5 Seconds | | 10 seconds | | 15 seconds | |
| EXAMPLE | TREATMENT | 0 days | 6 days | 0 days | 6 days | 0 days | 6 days |
| | Post-chill | | | | | | |
| 14C | 6% | 90 | 200 | 133 | 250 | 4 | 67 |
| | | 30 | 660 | 13 | 55 | 70 | 55 |
| 15C | 9% | 10 | 78 | 12,000 | 220 | 2,100 | 39 |
| | | <1 | 43 | 37 | 52 | 1,300 | 53 |
| 16C | 12% | <1 | 3,900 | 2 | 170 | <1 | 7 |
| | | 1 | 56 | <1 | 170 | <1 | 29 |
| | Pre-chill | | | | | | |
| 17C | 6% | 32 | 77 | 22 | 250 | 19 | 280 |
| | | 71 | 160 | 41 | 350 | 25 | 340 |
| 18C | 9% | 13 | 1 | 96 | 280 | 52 | 100 |
| | | 23 | <1 | 300 | 130 | 75 | 59 |
| 19C | 12% | 112 | 13 | 28 | <1 | 165 | 70 |
| | | 30 | <1 | 49 | <1 | 8 | 10 |

| | | SPRAY TIME | | | |
|---|---|---|---|---|---|
| | | *3 seconds | | **10 seconds | |
| | | 0 days | 6 days | 0 days | 6 days |
| | Post-chill | | | | |
| 20C | 12% | 51 | 5 | — | — |
| | | 7 | 12 | — | — |
| 21C | 12% | — | — | 6 | 2 |
| | | — | — | 2 | 16 |
| | Pre-chill | | | | |
| 22C | 12% | 7 | — | — | — |
| | | 7 | — | — | — |

| Control Post-chill | | Control Pre-chill | |
|---|---|---|---|
| 0 days | 6 days | 0 days | 6 days |
| 79 | 34 | 53 | — |

TABLE X-continued

Results (Day III) of Analysis for Enterobacteriacae

| 40 | 73 | — | — |

*2 seconds outside and 1 second inside
**7 seconds outside and 3 seconds inside
Note: Data in table is represented as number/ml

TABLE XI

Results (Day II) of Analysis for Enterobacteriacae

| | | DIP TIME | | | | |
|---|---|---|---|---|---|---|
| | | 5 Seconds | | 10 seconds | | 15 seconds | |
| EXAMPLE | TREATMENT | 0 days | 6 days | 0 days | 6 days | 0 days | 6 days |
| | Post-chill | | | | | | |
| 14D | 6% | — | — | 3 | 33 | 2 | 25 |
| | | — | — | <1 | 31 | 130 | 97 |
| 15D | 9% | <1 | 43 | 7 | 22 | <1 | 11 |
| | | 9 | 11 | 3 | 19 | 1 | 60 |
| 16D | 12% | 2 | 7 | 3 | 8 | <1 | 9 |
| | | 4 | 10 | <1 | 17 | <1 | 39 |
| | Pre-chill | | | | | | |
| 17D | 6% | 20 | 3,500 | 66 | 130 | 98 | 3,600 |
| | | 22 | 70 | 33 | 390 | 93 | 880 |
| 18D | 9% | 72 | 330 | 77 | 360 | 34 | 630 |
| | | 41 | 150 | 95 | 3,700 | 39 | 86 |
| 19D | 12% | 27 | 51 | 78 | 53 | 51 | 38 |
| | | 120 | 560 | 25 | 170 | 23 | 170 |

| Control Post-chill | |
|---|---|
| 0 days | 6 days |
| — | 132 |
| — | 60,000 |

Note: Data in table is represented as number/ml

TABLE XII

Results (Day III) of Analysis for *E. coli*

| | | DIP TIME | | | | | |
|---|---|---|---|---|---|---|---|
| | | 5 Seconds | | 10 seconds | | 15 seconds | |
| EXAMPLE | TREATMENT | 0 days | 6 days | 0 days | 6 days | 0 days | 6 days |
| | Post-chill | | | | | | |
| 14E | 6% | 40 | 52 | 85 | 30 | 3 | 9 |
| | | 6 | 30 | 5 | 10 | 13 | 2 |
| 15E | 9% | <1 | 32 | 1,200 | 51 | 30 | 12 |
| | | <1 | 5 | <1 | 6 | 1,200 | 14 |
| 16E | 12% | <1 | 8 | <1 | 7 | <1 | 2 |
| | | <1 | 10 | <1 | 16 | <1 | 10 |
| | Pre-chill | | | | | | |
| 17E | 6% | 27 | 41 | 9 | 50 | 9 | 33 |
| | | 57 | 100 | 22 | 250 | 13 | 80 |
| 18E | 9% | 10 | 1 | 94 | 100 | 36 | 48 |
| | | 21 | <1 | 300 | 61 | 61 | 6 |
| 19E | 12% | 107 | <1 | 13 | <1 | 78 | 23 |
| | | 15 | <1 | 47 | <1 | 3 | <1 |

| | | SPRAY TIME | | | |
|---|---|---|---|---|---|
| | | *3 seconds | | **10 seconds | |
| | | 0 days | 6 days | 0 days | 6 days |
| | Post-chill | | | | |
| 20E | 12% | 1 | <1 | — | — |
| | | 2 | 2 | — | — |
| 21E | 12% | — | — | 1 | <1 |
| | | — | — | <1 | 14 |
| | Pre-chill | | | | |
| 22E | 12% | <1 | — | — | — |
| | | 1 | — | — | — |

| Control Post-chill | | Control Pre-chill | |
|---|---|---|---|
| 0 days | 6 days | 0 days | 6 days |
| 12 | 4 | 50 | — |
| 33 | 20 | — | — |

*2 seconds outside and 1 second inside
**7 seconds outside and 3 seconds inside
Note: Data in table is represented as number/ml

TABLE XIII

Results (Day II) of Analysis for *E. coli*

| EXAMPLE | TREATMENT | DIP TIME | | | | | |
|---|---|---|---|---|---|---|---|
| | | 5 Seconds | | 10 seconds | | 15 seconds | |
| | | 0 days | 6 days | 0 days | 6 days | 0 days | 6 days |
| | Post-chill | | | | | | |
| 14F | 6% | — | — | <1 | 11 | <1 | 10 |
| | | — | — | <1 | 3 | 4 | 73 |
| 15F | 9% | <1 | 23 | <1 | 7 | <1 | 3 |
| | | 2 | 2 | <1 | 12 | <1 | 8 |
| 16F | 12% | <1 | 2 | <1 | 3 | <1 | 1 |
| | | <1 | 5 | <1 | 5 | <1 | 31 |
| | Pre-chill | | | | | | |
| 17F | 6% | 7 | 58 | 8 | 63 | 36 | 37 |
| | | 7 | 57 | 4 | 350 | 12 | 81 |
| 18F | 9% | 22 | 13 | 22 | 10 | 7 | 29 |
| | | 7 | 20 | 21 | 1,400 | 7 | 15 |
| 19F | 12% | 5 | 20 | 29 | 24 | 10 | 21 |
| | | 36 | 1 | 5 | 153 | 2 | 12 |

| Control Post-chill | |
|---|---|
| 0 days | 6 days |
| 20 | 36 |
| 15 | 3,100 |

Note: Data in table is represented as number/ml

TABLE XIV

Results (Day III) of Analysis for Salmonella

| EXAMPLE | TREATMENT | DIP TIME | | | | | |
|---|---|---|---|---|---|---|---|
| | | 5 Seconds | | 10 seconds | | 15 seconds | |
| | | 0 days | 6 days | 0 days | 6 days | 0 days | 6 days |
| | Post-chill | | | | | | |
| 14G | 6% | — | — | — | — | — | — |
| | | — | — | — | — | — | — |
| 15G | 9% | — | — | — | + | — | — |
| | | — | — | — | — | — | — |
| 15G | 12% | — | — | — | — | — | — |
| | | — | — | — | — | — | — |
| | Pre-chill | | | | | | |
| 17G | 6% | — | — | — | — | — | — |
| | | — | — | + | — | — | — |
| 18G | 9% | — | + | — | — | — | — |
| | | — | + | — | — | — | — |
| 19G | 12% | — | — | — | — | — | — |
| | | — | + | — | — | — | — |

| EXAMPLE | TREATMENT | SPRAY TIME | | | |
|---|---|---|---|---|---|
| | | *3 seconds | | **10 seconds | |
| | | 0 days | 6 days | 0 days | 6 days |
| | Post-chill | | | | |
| 20G | 12% | — | — | NA | NA |
| | | — | — | NA | NA |
| 21G | 12% | NA | NA | — | — |
| | | NA | NA | — | — |
| | Pre-chill | | | | |
| 22G | 12% | — | NA | NA | NA |
| | | — | NA | NA | NA |

| Control Post-chill | | Control Pre-chill | |
|---|---|---|---|
| 0 days | 6 days | 0 days | 6 days |
| — | + | — | NA |
| — | — | NA | NA |

*2 seconds outside and 1 second inside
**7 seconds outside and 3 seconds inside
Note: Data in table is represented as number/25 ml

TABLE XV

Results (Day II) of Analysis for Salmonella

| EXAMPLE | TREATMENT | DIP TIME | | | | | |
|---|---|---|---|---|---|---|---|
| | | 5 Seconds | | 10 seconds | | 15 seconds | |
| | | 0 days | 6 days | 0 days | 6 days | 0 days | 6 days |
| | Post-chill | | | | | | |
| 14H | 6% | NA | NA | — | — | — | — |

TABLE XV-continued

Results (Day II) of Analysis for Salmonella

| | | NA | NA | | | | |
|---|---|---|---|---|---|---|---|
| 15H | 9% | — | — | — | — | — | — |
| | | — | — | — | — | — | — |
| 16H | 12% | — | — | — | — | — | — |
| | | — | — | — | — | — | — |
| | Pre-chill | | | | | | |
| 17H | 6% | — | — | + | — | + | — |
| | | — | — | — | — | — | — |
| 18H | 9% | — | — | — | — | — | — |
| | | — | — | + | — | — | — |
| 19H | 12% | — | — | — | — | — | — |
| | | — | — | — | — | — | — |

| | Control Post-chill | |
|---|---|---|
| | 0 days | 6 days |
| | — | — |
| | — | — |

Note: Data in table is represented as number/25 ml.

RESULTS

Table VII

The pre-chill results of the total plate count tests are inconclusive but the post chill treatment with trisodium orthophosphate did reduce the plate count compared to control. Spray results would indicate reduction in plate count due to treatment.

Table IX

The results are inconclusive.

Table X

The pre-chill and post-chill treatment, dip or spray, with trisodium orthophosphate is effective in reducing the count of Enterobacteriacae with the spray results very positive.

Table XI

The data appears to confirm the reduction in bacteria found in Table X, especially post-chill treatment.

Table XII

The pre-chill and post-chill treatment, dip or spray, with trisodium orthophosphate is effective in reducing the count of E. coli, particularly at higher trisodium orthophosphate concentration.

Tables XIV and XV

The treatment with trisodium orthophosphate results in only one incident of salmonella presence in post-chill treatment.

Trialkali metal phosphate solution at 4% or greater is also effective against campylobacter type organisms such as C. jejuni and the like.

EXAMPLE 23

Further tests were conducted on whole uninoculated broiler carcasses without giblets removed right after the chilling step in a poultry process. The birds were obtained from a local poultry processor on the day of slaughter. Three hundred carcasses packed on ice and held in a cooler (40°) on ice until used in the study. The birds were taken randomly from the boxes for each of the tests.

Sterile solutions of varying concentrations of trisodium orthophosphate were previously prepared each day for the day's tests. A total of 60 birds were tested per trisodium phosphate concentration for three exposure times resulting in 20 birds tested for each TSP concentration/exposure time variable. The testing was done over 4 separate days (over a 7 day period) with five birds per TSP/exposure time variable studied each day;

On each day a trial was conducted, an adequate number of birds for each test variable were randomly selected from each of the shipping cartons being held under refrigeration. The birds were placed in the designated TSP solution and gently agitated during the exposure time. After the specified immersion time was completed, the birds were removed from the solution legs first and drained for a period of 30 seconds. After the drain period each processed bird was placed in a separate sterile plastic bag containing 200 ml of sterile Butterfield's Phosphate Buffer and rinsed for one minute by shaking through a one foot arc. After the whole carcass rinse procedure was completed, the rinse waters were divided into two equal aliquots (ca. 100 ml each) in sterile whirlpak bags. One of the two rinse waters obtained from each bird was immediately neutralized using 12N HCl prior to adding the 10× Lactose Broth enrichment medium and held at room temperature for 30 minutes. The second rinse water per bird was enriched with 10× Lactose Broth immediately, held at room temperature for 30 minutes, and then neutralized with 6N HCl. That Broth enriched wash waters were then incubated at 35° C. for 24 hours prior to evaluation by the Gene Trak Systems ® colorimetric DNA probe test for the rapid detection of Salmonella species (FDA, 1984; Rose et al., 1991). Samples determined to be positive by the gene probe assay were confirmed by conventional culture methodology (USDA, 1974). These assays determine the presence (positive) or absence (negative) of salmonella DNA.

The results are summarized in tables XVI–XXIII.

The data is summarized for all four days tests where the incident of salmonella on control birds was extremely low and unexpected. The data in tables XVI-XXI (neutralized and unneutralized buffer) clearly shows that dipping poultry in treatment solutions containing 8% and 12% trisodium orthophosphate reduces salmonella incidence to zero in the 10 second and 30 second dip tests. The overall results in Table XXII for the testing show no salmonella present on 20 birds when treated with solutions of 8% and 12% trisodium orthophosphate for 10 and 30 second dip times and only 1 contaminated bird for the 15 minute dip time compared to 5 contaminated birds for control, 5 contaminated birds for 1% TSP and 4 contaminated birds for 4% TSP.

Table XXIII summarizes the percent of positive incidence of Salmonella found for each bird after treatment and clearly shows that treatment of broilers during processing with at least about 4% trisodium orthophosphate reduces the incidence of Salmonella contamination. The present experiment on uninoculated birds is clear evidence that high concentrations of trisodium orthophosphate solution is unexpectedly able to reduce the incidence of natural Salmonella contamination on broilers compared to a water wash or use of low concentrations (1% or less) trisodium phosphate. The test results of tables XXII and XXIII confirm the earlier results set forth herein which indicate that a treatment solution containing about 4% or more trisodium orthophosphate is effective to remove, reduce or retard salmonella nd other bacteria on poultry.

TABLE XVI

Salmonella Incidence on Post-Chill whole broilers after 10 second exposure to Trisodium orthophosphate (TSP) (Neutralized Buffer)

10 sec Dip
Incidence per day
5 birds for each test

| Concentration TSP | 1st day | 2nd day | 3rd day | 4th day | Average for 4 days |
|---|---|---|---|---|---|
| 0 | 0/5 | 1/5 | 0/5 | 1/5 | 2/20 |
| 1% | 1/5 | 0/5 | 0/5 | 1/5 | 2/20 |
| 4% | 0/5 | 1/5 | 1/5 | 0/5 | 2/20 |
| 8% | 0/5 | 0/5 | 0/5 | 0/5 | 0/20 |
| 12% | 0/5 | 0/5 | 0/5 | 0/5 | 0/20 |

TABLE XVII

· Salmonella Incidence on Post-Chill whole broilers after 30 seconds of Trisodium orthophosphate (TSP) (Neutralized buffer)

30 Sec. Dip
Incidence per day
5 birds for each test

| Concentration TSP | 1st day | 2nd day | 3rd day | 4th day | Average for 4 days |
|---|---|---|---|---|---|
| 0 | 0/5 | 0/5 | 0/5 | 1/5 | 1/20 |
| 1% | 1/5 | 1/5 | 0/5 | 0/5 | 2/20 |
| 4% | 0/5 | 0/5 | 0/5 | 1/5 | 1/20 |
| 8% | 0/5 | 0/5 | 0/5 | 0/5 | 0/20 |
| 12% | 0/5 | 0/5 | 0/5 | 0/5 | 0/20 |

TABLE XVIII

Salmonella Incidence on Post-Chill whole broilers after 15 minute exposure to Trisodium orthophosphate (TSP) (Neutralized buffer)

15 Minute Dip
Incidence per day
5 birds per test

| Concentration TSP | 1st day | 2nd day | 3rd day | 4th day | Average for 4 days |
|---|---|---|---|---|---|
| 0 | 1/5 | 0/5 | 0/5 | 0/5 | 1/20 |
| 1% | 0/5 | 1/5 | 0/5 | 0/5 | 1/20 |
| 4% | 1/5 | 0/5 | 0/5 | 0/5 | 1/20 |
| 8% | 0/5 | 0/5 | 0/5 | 0/5 | 0/20 |
| 12% | 1/5 | 0/5 | 0/5 | 0/5 | 1/20 |

TABLE XIX

Salmonella Incidence on Post-Chill whole broilers after 10 second exposure to Trisodium orthophosphate (TSP) (Non-neutralized buffer)

10 Second
Incidence per day
5 days for each test

| Concentration TSP | 1st day | 2nd day | 3rd day | 4th day | Average of all 4 days |
|---|---|---|---|---|---|
| 0 | 0/5 | 0/5 | 0/5 | 1/5 | 1/20 |
| 1% | 0/5 | 0/5 | 0/5 | 1/5 | 1/20 |
| 4% | 0/5 | 0/5 | 1/5 | 0/5 | 1/20 |
| 8% | 0/5 | 0/5 | 0/5 | 0/5 | 0/20 |
| 12% | 0/5 | 0/5 | 0/5 | 0/5 | 0/20 |

TABLE XX

Salmonella Incidence on Post-Chill whole broilers after 30 second exposure to Trisodium orthophosphate (TSP) (Non-neutralized buffer)

30 Seconds Dip
Incidence per day
5 birds for each test

| Concentration TSP | 1st day | 2nd day | 3rd day | 4th day | Average of all 4 days |
|---|---|---|---|---|---|
| 0% | 0/5 | 1/5 | 0/5 | 1/5 | 2/20 |
| 1% | 0/5 | 0/5 | 0/5 | 0/5 | 0/20 |
| 4% | 0/5 | 0/5 | 0/5 | 1/5 | 1/20 |
| 8% | 0/5 | 0/5 | 0/5 | 0/5 | 0/20 |
| 12% | 0/5 | 0/5 | 0/5 | 0/5 | 0/20 |

TABLE XXI

Salmonella Incidence on Post Chill whole broilers after 15 minutes exposure to Trisodium orthophosphate (TSP) (Non-neutralized buffer)

15 Minutes Dip
Incidence per day
5 birds for each test

| Concentration TSP | 1st day | 2nd day | 3rd day | 4th day | Average of all 4 days |
|---|---|---|---|---|---|
| 0% | 0/5 | 0/5 | 0/5 | 0/5 | 0/20 |
| 1% | 0/5 | 0/5 | 0/5 | 0/5 | 0/20 |
| 4% | 0/5 | 0/5 | 0/5 | 0/5 | 0/20 |
| 8% | 0/5 | 0/5 | 0/5 | 0/5 | 0/20 |
| 12% | 1/5 | 0/5 | 0/5 | 0/5 | 1/20 |

· TABLE XXII

Detection of Salmonella positive post chill whole broiler carcasses after exposure to various concentrations of Trisodium Phosphate (all trials)

| Exposure Time | Trisodium Phosphate Concentration (% w/w) | Neutralized Buffer | Non-Neutralized Buffer | Total[a] |
|---|---|---|---|---|
| 10 Seconds | 0 | 2/20[b] | 1/20 | 2/20 |
|  | 1 | 2/20 | 0/20 | 2/20 |
|  | 4 | 2/20 | 1/20 | 2/20 |
|  | 8 | 0/20 | 0/20 | 0/20 |
|  | 12 | 0/20 | 0/20 | 0/20 |
| 30 Seconds | 0 | 1/20 | 1/20 | 2/20 |
|  | 1 | 2/20 | 0/20 | 2/20 |
|  | 4 | 1/20 | 1/20 | 1/20 |
|  | 8 | 0/20 | 0/20 | 0/20 |
|  | 12 | 0/20 | 0/20 | 0/20 |
| 15 Minutes | 0 | 1/20 | 0/20 | 1/20 |
|  | 1 | 1/20 | 0/20 | 1/20 |
|  | 4 | 1/20 | 0/20 | 1/20 |
|  | 8 | 0/20 | 0/20 | 0/20 |
|  | 12 | 1/20 | 1/20 | 1/20 |

[a]Total number of individual birds found to be positive for Salmonella.
[b]Number of individual birds positive for Salmonella per number of individual birds tested.

TABLE XXIII

Percent of Salmonella positive post chill whole broiler carcasses detected after exposure to various concentrations of Trisodium Phosphate[a]

| Trisodium Phosphate Concentration (% w/w) | Percent Positive |
|---|---|
| 0 | 8.3 |
| 1 | 8.3 |
| 4 | 6.7 |
| 8 | 0 |
| 12 | 1.7 |

[a] Percent of birds found to be positive for Salmonella for all exposure times for all trials.

Trisodium phosphate either alone or in combination with other food ingredients seems to have great potential for use in eliminating salmonella on poultry carcasses.

What is claimed is:

1. A process for treating poultry carcasses comprising contacting the poultry with a treatment solution having a pH above about 11.5, said solution containing trialkali metal orthophosphate present in an amount of from about 4% or greater based on the weight of the solution, the proviso that the treatment solution does not contain alcohol, said treatment being conducted for a period of time effective to remove, reduce over retard salmonella contamination and/or growth and insufficient to cause organoleptic depreciation of the poultry.

2. The process of claim 1 wherein the amount of phosphate is about 8% or greater based on the weight of the solution.

3. A process as recited in claim 1 wherein said orthophosphate is trisodium orthophosphate.

4. A process as recited in claim 1 wherein said pH ranges from about 11.6 to 13.5.

5. A process as recited in claim 1 wherein residual phosphate is left on the poultry to provide reduced bacterial activity on the surface of the poultry.

6. A process as recited in claim 1 wherein said poultry is treated at a temperature of 0° C. to 70° C.

7. A process as recited in claim 1 wherein said poultry is treated at a temperature of 40° C. to 70° C.

8. A process as recited in claim 1 wherein said poultry is treated at a temperature of 20° C. to 40° C.

9. A process as recited in claim 1 wherein said poultry is treated at a temperature equal to or less than 10° C.

10. A process as recited in claim 1 wherein said poultry is treated by dip or spray for 1 second to 2 hours at a temperature of less than 27° C.

11. A process for treating poultry carcasses comprising contacting the poultry with a treatment solution having a pH above 11.5, said solution consisting essentially of trialkali metal orthophosphate present in an amount from about 4% or greater, based on the weigh of the solution, said treatment being conducted for a period of item effective to remove, reduce or retard salmonella contamination and/or growth.

12. The process of claim 11 wherein the amount of orthophosphate is from about 4% to salutation and the pH ranges from 11.6 to 13.5.

13. The process of claim 12 wherein said orthophosphate is trisodium orthophosphate.

14. The process of claim 13 wherein said poultry is treated at a temperature below 27° C. for 2 seconds to two hours.

15. The process of claim 13 wherein said poultry is treated at a temperature below 10° C. for 2-30 seconds.

* * * * *

UNITED STATES PATENT AND TRADEMARK OFFICE
CERTIFICATE OF CORRECTION

PATENT NO. : 5,143,739
DATED : September 1, 1992
INVENTOR(S) : Fred Bender, et al.

It is certified that error appears in the above-identified patent and that said Letters Patent is hereby corrected as shown below:

```
    Column 31, line 27, Claim 1:   "over"  should read
as --or--
    Column 32, line 21, Claim 11:  "weigh"  should
read as --weight--
    Column 32, line 23, Claim 11:  "item"  should
read as --time--
    Column 32, line 26, Claim 12:  "salutation"
should read as --saturation--
```

Signed and Sealed this

Twelfth Day of October, 1993

Attest:

BRUCE LEHMAN

*Attesting Officer*    *Commissioner of Patents and Trademarks*